(12) United States Patent
Sanchez Rola et al.

(10) Patent No.: US 11,972,027 B1
(45) Date of Patent: Apr. 30, 2024

(54) PRESERVING WEB PAGE FUNCTIONALITY THROUGH DYNAMIC ANALYSIS OF HOST WEB PAGES

(71) Applicant: NortonLifeLock Inc., Tempe, AZ (US)

(72) Inventors: Iskander Sanchez Rola, Antibes (FR); Johann Roturier, Maynooth (IE); David Luz Silva, Dublin (IE)

(73) Assignee: GEN DIGITAL INC., Tempe, AZ (US)

( * ) Notice: Subject to any disclaimer, the term of this patent is extended or adjusted under 35 U.S.C. 154(b) by 373 days.

(21) Appl. No.: 17/512,235

(22) Filed: Oct. 27, 2021

(51) Int. Cl.
*G06F 21/62* (2013.01)
*G06F 16/958* (2019.01)
*H04L 9/40* (2022.01)

(52) U.S. Cl.
CPC ........ *G06F 21/6263* (2013.01); *G06F 16/986* (2019.01); *H04L 63/0236* (2013.01); *H04L 63/20* (2013.01)

(58) Field of Classification Search
CPC .... G06F 21/62; G06F 16/958; G06F 21/6263; G06F 16/986; H04L 9/40; H04L 63/0236; H04L 63/20
See application file for complete search history.

(56) References Cited

U.S. PATENT DOCUMENTS

| 9,323,861 B2 * | 4/2016 | Shepherd | G06F 16/9574 |
| 11,522,837 B2 * | 12/2022 | Maslen | G06F 16/951 |
| 2021/0400085 A1 * | 12/2021 | Stokes | H04L 63/20 |

FOREIGN PATENT DOCUMENTS

AU    2014229063 A1 * 10/2015 ....... G06F 17/30893

OTHER PUBLICATIONS

BROWSERSTACK; "Deliver pixel-perfect UI with automated visual testing"; Webpage; located at: https://www.browserstack.com/percy; accessed on Oct. 27, 2021; 3 pages.
APPLITOOLS; "Visual Testing—Everything you need to know about Visual Testing"; Webpage; located at: https://applitools.com/visual-testing/; accessed on Oct. 27, 2021; 3 pages.

* cited by examiner

*Primary Examiner* — Jayesh M Jhaveri
(74) *Attorney, Agent, or Firm* — MASCHOFF BRENNAN

(57) ABSTRACT

Preserving web page functionality through dynamic analysis of host web pages. Web pages accessed by a user device may be monitored. The web browser may apply a blocking policy that blocks an external domain from loading functional content into the web page, which results in a breakage in the web page. The breakage in the web page may be identified through a dynamic analysis of the web page and correlated with the functional content from the blocked external domain. Once identified and correlated, the blocking policy may be modified to allow the external domain to load the functional content and reloading the web page.

14 Claims, 4 Drawing Sheets

PRESERVING WEB PAGE FUNCTIONALITY THROUGH DYNAMIC ANALYSIS OF HOST WEB PAGES

BACKGROUND

Many host web pages that are accessible on the Internet today include content that is provided to the host web page from one or more external domains. Some of the content provided to host web pages from external domains enables functionality on the host web page. For example, some external domains enable media references or widgets on host web pages. Some of the content provided to host web pages from external domains does not enable any functionality on the host web page. Further, some of the content provided to host web pages from external domains enables tracking functions that can result in privacy violations to users that visit the host web pages.

Many browser extensions enforce policies that block some or all of these external domains from loading content into host web pages. By blocking some or all of the content provided to host web pages from external domains, web pages may load faster and the violations caused by tracking domains can be avoided. However, blocking external domains that enable some functionality on host web pages will result in some breakage of the web pages. To fix these breakages, visitors to the host web pages may elect to disable the blocking policy enforced by their browser extension. While this may remedy the breakages, it will also permit all other external domains to load their content into the host web pages. Thus, when breakages in web pages occur due to a blocking policy, users are often forced to choose between the protection provided by the blocking policy and fully functional web pages.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for preserving web page functionality through dynamic analysis of host web pages may be performed, at least in part, by a computing device comprising one or more processors. The method may include monitoring a web page accessed through a web browser, wherein the web browser applies a blocking policy that blocks an external domain from loading functional content into the web page resulting in a breakage in the web page, identifying the breakage in the web page through a dynamic analysis of the web page, correlating the breakage in the web page with the functional content from the blocked external domain, modifying the blocking policy to allow the external domain to load the functional content, and reloading the web page.

In some embodiments, the dynamic analysis of the web page may include a visual analysis of the web page. In these embodiments, the visual analysis of the web page may include obtaining a model that is trained to identify visual indications of broken functionalities using total or partial perceptual image hashing, the model having been trained using a dataset of exemplary web pages having at least one broken functionality, and applying the model to the web page.

In some embodiments, the dynamic analysis of the web page may include a document object model (DOM) analysis of the web page. In these embodiments, the DOM analysis may identify the breakage by analyzing a console of the web page, a local position on the web page, an element name, a structure, or a related class/style.

In some embodiments, the dynamic analysis of the web page may include detecting a recognition, by the web page itself, of the breakage. In these embodiments, the recognition, by the web page itself, of the breakage may be evidenced by a visual banner on the web page that identifies the breakage. In these embodiments, the banner may be identified through a visual analysis of the web page and a natural language processing analysis is performed on a message contained within the banner.

In some embodiments, the breakage in the web page may be correlated to the functional content from the blocked external domain by connecting a load time of the blocked functional content to a time at which the breakage is identified.

In some embodiments, one or more non-transitory computer-readable media may comprise one or more computer-readable instructions that, when executed by one or more processors of a security device, cause the security device to perform a method for preserving web page functionality through dynamic analysis of host web pages.

In some embodiments, a computing device comprising one or more processors and one or more non-transitory computer-readable media comprising one or more computer-readable instructions that, when executed by the one or more processors, may cause the computing device to perform a method for preserving web page functionality through dynamic analysis of host web pages.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
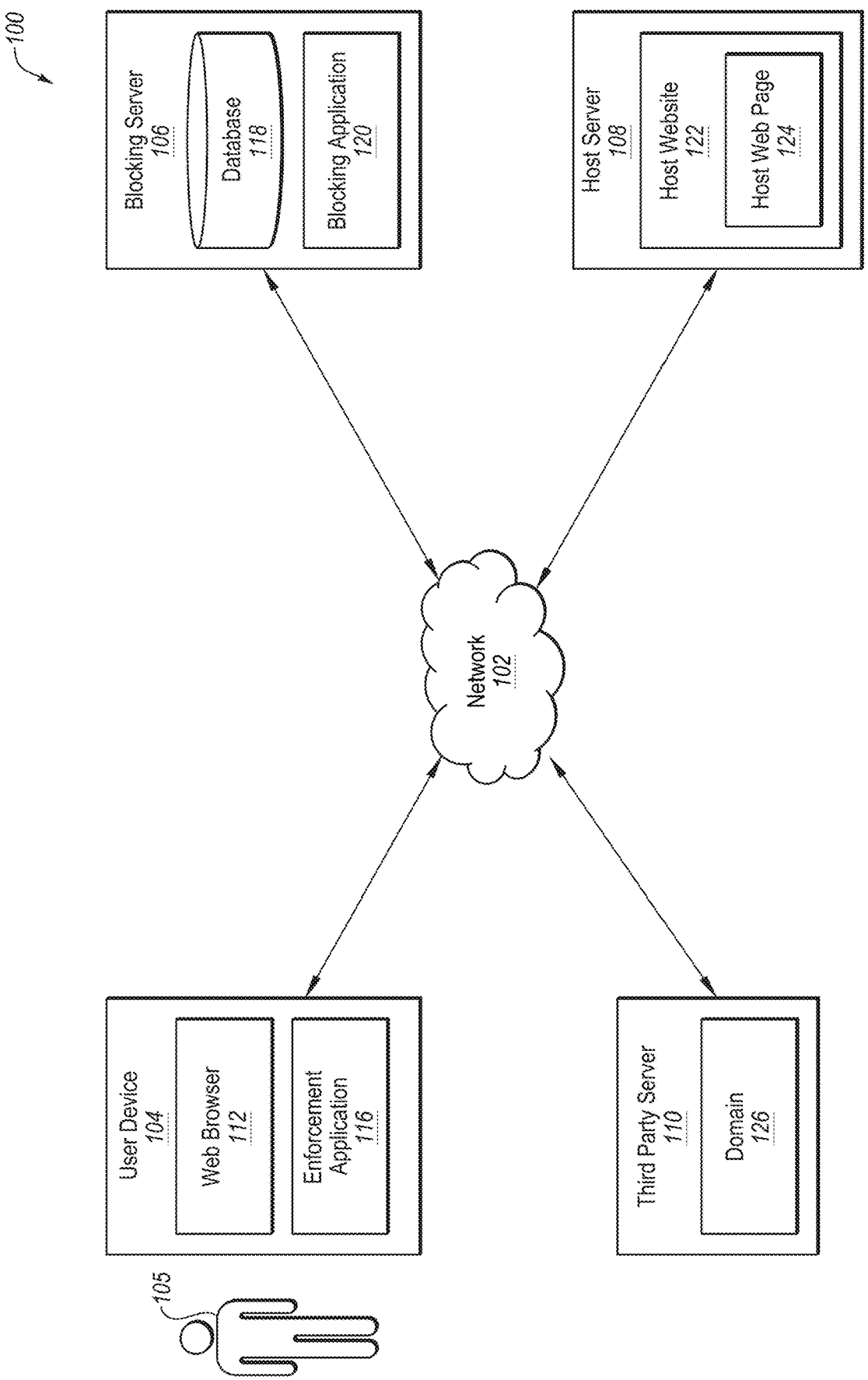
FIG. 1 illustrates an example system configured for preserving web page functionality through dynamic analysis of host web pages.

Many host web pages that are accessible on the Internet today include content (including one or more components) provided to the host web page from one or more external sources (hereafter, "external domains"). Some of the content provided to host web pages from these external domains enables some functionality on the host web page. For example, some external domains may enable media references, such as video clips, audio clips, or photos. Other external domains may enable widgets that, for example, may allow a user to perform a search on a host web page. Some of the content provided to host web pages from external domains do not enable any functionality on the host web page. Further, some of the content provided to host web pages from external domains enables tracking functions that can result in privacy violations.

Many browser extensions enforce policies that block some or all of these external domains from loading content into host web pages. By blocking some or all of the content provided to host web pages from external domains, web pages may load faster and the violations caused by malicious or privacy invasive tracking domains can be avoided. However, blocking external domains that enable some functionality on host web pages will result in breakage of the web pages. These breakages may present as a rendering problem in a visual element on the host web page or lost functionality in the host web page. Many Internet users have reported visiting at least one web page that has failed to function correctly because of a blocking policy enforced by the user's browser extension. Thus, it is clear that some external domains are critical for the correct functioning (including rendering) of web pages. For example, without these external domains enabling functionality, users may be unable to complete online purchases or contact support agents via chat widgets.

To fix these breakages, visitors to host web pages sometimes disable the blocking policy enforced by their browser extension. While this may remedy the breakages by allowing the functional external domain to load its content, it will also permit all other external domains to load their content into host web pages. This may result in slower web page load times and privacy violations.

Some embodiments disclosed herein may enable preserving web page functionality through dynamic analysis of host web pages. In particular, in some embodiments, a computer-implemented method that may include monitoring a web page accessed through a web browser. The web browser may apply a blocking policy that blocks an external domain from loading functional content into the web page, which results in a breakage in the web page. The method may also include identifying the breakage in the web page through a dynamic analysis of the web page and correlating the breakage in the web page with the functional content from the blocked external domain. Once identified and correlated, the method may include modifying the blocking policy to allow the external domain to load the functional content and reloading the web page.

Turning to the figures, FIG. 1 illustrates an example system 100 configured for preserving web page functionality through dynamic analysis of host web pages. The system 100 may include a network 102, a user device 104 and associated user 105, a blocking server 106, a host server 108, and a third-party server 110.

In some embodiments, the network 102 may be configured to communicatively couple the user device 104, the blocking server 106, the host server 108, and the third-party server 110. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 4:
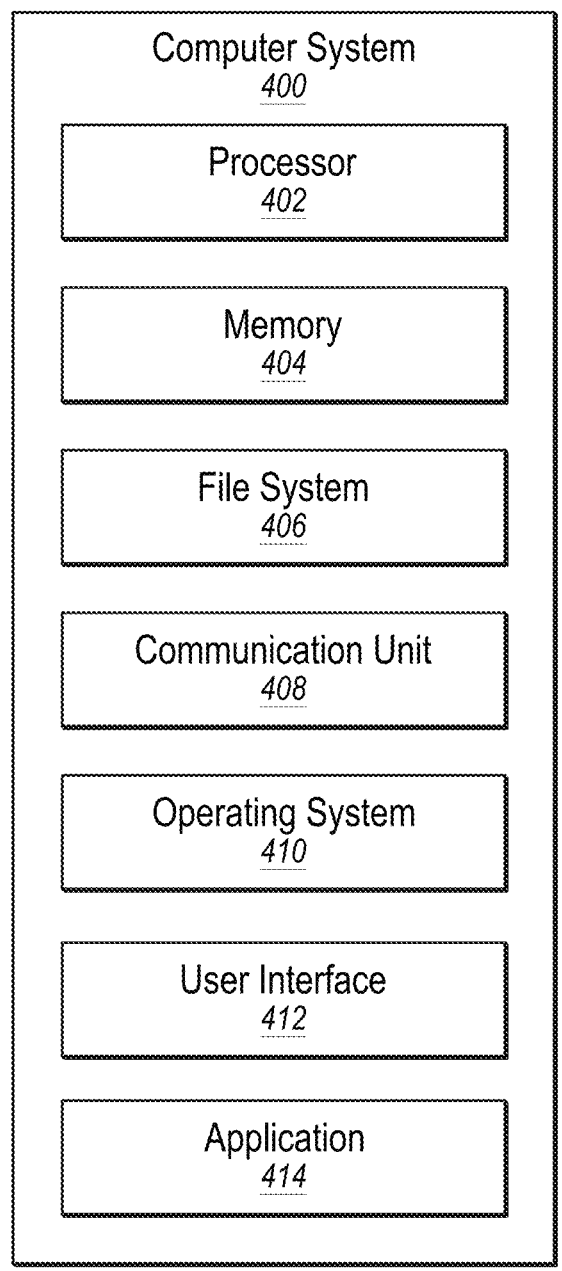
FIG. 4 illustrates an example computer system that may be employed in preserving web page functionality through dynamic analysis of host web pages.

In some embodiments, the user device 104 may be any computer system capable of communicating over the network 102 and vising one or more websites over network 102, examples of which are disclosed herein in connection with the computer system 400 of FIG. 4. In some embodiments, the user device 104 may include a web browser 112. The web browser 112 may enable the user 105 to access third party content, such as websites, over the network 102. In some embodiments, the user device 104 may also include an enforcement application 116. The enforcement application 116 may be configured to enforce a policy that blocks one or more external domains from loading content into a host web page that the user 105 visits through the web browser 112. The enforcement application 116 could be configured in a variety of different ways. For example, the enforcement application 116 could be configured as an extension or a plugin or an addon to the web browser 112. Regardless of how the enforcement application 116 is configured, the enforcement application 116 may interface with the blocking server 106 to determine which domains to block each time the user 105 visits a web page through the web browser 112.

In some embodiments, the blocking server 106 may be any computer system capable of communicating over the network 102, examples of which are disclosed herein in connection with the computer system 400 of FIG. 4. In some embodiments, the blocking server 106 may include a database 118. The database 118 may include a dataset of web pages that have at least one broken functionality due to a domain being blocked from loading content into the web pages. The broken functionality may present as a rendering problem in a visual element on a web page or lost functionality in the web page. This dataset may be created by intentionally blocking external domains that are known to provide some functionality to the web pages from loading.

In some embodiments, the blocking server 106 may also include a blocking application 120. As provided in more detail in FIG. 2, the blocking application 120 may be configured to enforce a policy, through enforcement application 116, that blocks one or more external domains from loading content into a host web page that the user 105 visits through the web browser 112. The blocking application 120 may also be configured to dynamically analyze host web pages that the user 105 visits through web browser 112 to identify breakages in host web pages caused by blocked external domain content and modify the policy enforced to allow these functional external domains to load their content. The blocking application 120 may be configured to identify breakages by performing a visual component analysis, modeling web document structures, supervising network-layer connections, and/or processing web-initiated messages.

In some embodiments, the host server 108 may be any computer system capable of communicating over the network 102, examples of which are disclosed herein in connection with the computer system 400 of FIG. 4. In some embodiments, host server 108 may include a host website 122, which may include a host web page 124. The host website 122 and the host web page 124 may be accessed by the user 105 through the web browser 112. The host web page 124 may include content that is loaded from one or more external domains. This content may be loaded in one or more frames in the host web page 124 or in banners that appear at a top, bottom, or along the sides of the host web page 124. Alternatively, the external domains may load content into the host web page 124 by embedding the content directly within the host web page 124.

In some embodiments, the third-party server 110 may be any computer system capable of communicating over the network 102, examples of which are disclosed herein in connection with the computer system 400 of FIG. 4. In some embodiments, the third-party server 110 may include a domain 126. Third-party server 110 may load content into one or more host web pages, such as web page 124, through the domain 126. The domain 126 may also provide some functionality to the host web page(s) on which it loads content. For example, the domain 126 may provide a media reference, such as a video clip or an audio clip, into a host web page. The domain 126 may also provide an on-screen tool, such as a site search or chat function to the host web page. The domain 126 may also provide TV/video streams or radio/audio streams.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. In one such embodiment, the database 118 may be external to the blocking server 106. In another embodiment, the blocking application 120 may be located within the user device 104. In another embodiment, the enforcement application 116 and/or the blocking application 120 may be part of the web browser 112.

Figure 2:
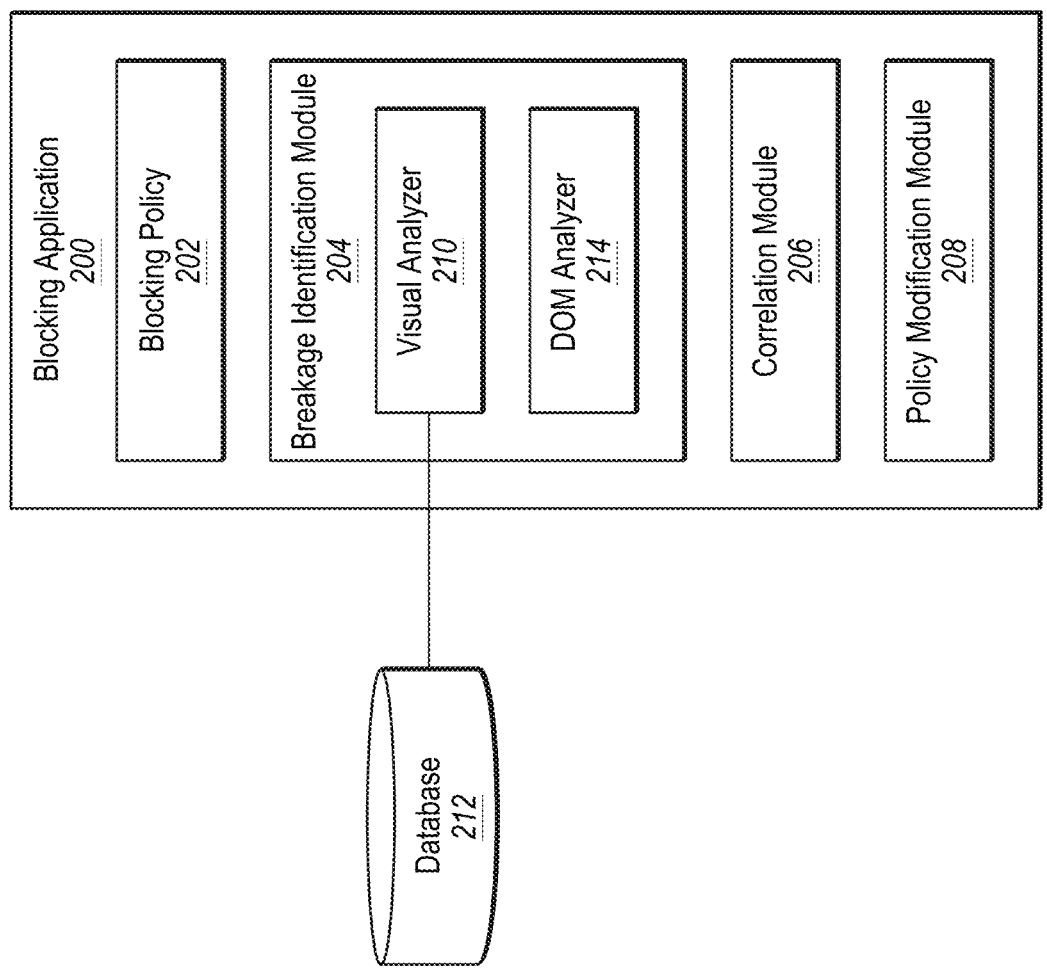
FIG. 2 illustrates an exemplary blocking application.

FIG. 2 illustrates an exemplary blocking application 200. For example, the blocking application 200 may be implemented in the system illustrated in FIG. 1 as the blocking application 120, which is configured to communicate with the enforcement application 116 on the user device 104. Alternatively, the blocking application 200 may be implement within the user device 104 as part of the enforcement application 116, as a separate application, are as part of a customized web browser. Like the enforcement application 116, blocking application 200 could be configured in a variety of different ways. For example, the blocking application 200 could be configured as an extension or a plugin or an addon to a web browser on a user device. In one embodiment, the blocking application 200 may include a blocking policy 202, a breakage identification module 204, a correlation module 206, and a policy modification module 208.

In one embodiment, the blocking policy 202 may provide a policy that identifies external domains that should be blocked from loading content on web pages. This policy may be communicated to one or more user devices, such as the user device 104. An enforcement application on a user device, such as the enforcement application 116 on the user device 104 may enforce the blocking policy 202. The blocking policy 202 may use any number of different standards to identify external domains that should be blocked. For example, in one embodiment the blocking policy 202 may block external domains that perform tracking or other undesirable activities on a host web page.

In one embodiment, the breakage identification module 204 may monitor web pages accessed by a user device and perform a dynamic analysis of the accessed web pages to determine whether a breakage has occurred due to content from an external domain being blocked. The breakage identification module 204 may perform this analysis dynamically, or in real-time, as the web page loads on a user device or as a feature of a web page malfunctions, or within a short period of time (a few seconds) after the breakage occurs. For example, in one embodiment, the breakage identification module 204 may identify a video that fails to load on a host web page as the web page is loading into a user's browser. In another embodiment, the breakage identification module 204 may identify a suggestion function on a site search widget that fails to load on a host web page as the user types characters into the search field of the widget.

The breakage identification module 204 may employ one or both of a visual analyzer 210 and a document object model (DOM) analyzer 214 to identify breakages in web pages. The visual analyzer 210 may be configured to identify breakages in web pages based on the appearance of the web page. In one embodiment, the visual analyzer 210 may access a dataset of exemplary web pages that have at least one broken functionality. This dataset may be stored in a database 212, which is accessible by the breakage identification module 204. In one embodiment, the dataset of broken web pages may be generated by intentionally blocking one or more external domains that are known to load content that provides some functionality to a web page. Once this dataset is obtained, a model may be generated that is able to identify visual indications of how breakages visually present on the web pages. These visual indications may include blank spots on a web page or other words, symbols, patterns, etc. that are displayed on a web page when a breakage has occurred. In some embodiments, this model may be trained using total or partial perceptual image hashing. The model generated may be a machine learning model. A hardware-accelerated JavaScript library (e.g., "TensorFlow.js") may be used to train and deploy this machine learning model in order to identify web page breakages dynamically.

The DOM analyzer 214 may be configured to identify breakages by modeling web document structures and supervising network-layer connections to identify elements that are missing on the web page. For example, the DOM analyzer 214 may identify a missing element by detecting a partially or entirely empty content division element (<div>) within the DOM. A functionality that corresponds to the missing element may be identified by determining a local position on the web page, element names, structure, and their related classes/styles. For example, a form or survey may have field specific styles already indicated in a previously included cascading style sheets (e.g., "progressWrapper").

In addition, the breakage identification module 204 may identify web page breakages by detecting a breakage notification presented by the web page itself. These notifications, depending on how they are presented, may be detected by either the visual analyzer 210 or the DOM analyzer 214. Some web pages may present these notifications in banners displayed to a user. These banners may cover all or a portion of the web page. The visual analyzer 210 may perform a natural language processing analysis to determine what the notification states in order to identify the breakage that has occurred. Alternatively, an error notice may arise in the console or background of the web page, which may not be presented visually to the user. In this scenario, the error notices may be detected by the DOM analyzer 214 to identify the breakage.

Once the breakage identification module 204 has identified a breakage in a web page, the correlation module 206 may connect the breakage to a blocked external domain that was prevented from loading the content that is responsible for the breakage. In one embodiment, loading times of blocked content and/or orders of resources used on the web page are compared to times when breakages are detected. By correlating the timing of content blocked and resources used with the timing of breakages identified, the correlation module 206 may identify the blocked external domain responsible for the breakage.

Once the correlation module 206 has identified the blocked external domain responsible for the breakage, the policy modification module 208 may modify the blocking policy 202 so that the external domain responsible for the breakage is permitted to load content on the web page. In one embodiment, the policy modification module 208 may simply modify the blocking policy 202 to allow the blocked domain to load its content. Alternatively, the policy modification module 208 may alter the blocked external domain before modifying the blocking policy 202. For example, the eternal domain may be altered by stripping out a tracking capability from the external domain before it is permitted to load content in the web page. Once the policy modification module 208 has modified the blocking policy 202, the web page may be reloaded so that the blocked external domain is not blocked and the breakage is avoided.

By performing this dynamic analysis on host web pages, breakages that occur due to a blocking policy may be identified and corrected quickly and efficiently. By modifying a blocking policy to allow content to be loaded by only external domains that are responsible for a breakage in the web page, other external domains (e.g., domains that perform tracking activities) remain blocked.

Modifications, additions, or omissions may be made to the blocking application 200 without departing from the scope of the present disclosure. For example, the blocking application 200 may include additional components similar to the components illustrated in FIG. 2 that each may be configured similarly to the components illustrated in FIG. 2. Further, in some embodiments, the functionality of the blocking application 200 may be spread across two or more separate blocking applications, such as where the function of the breakage identification module 204 is performed on a first blocking application and the functions of the correlation module 206 and the policy modification module 208 are performed on a second blocking application.

Figure 3:
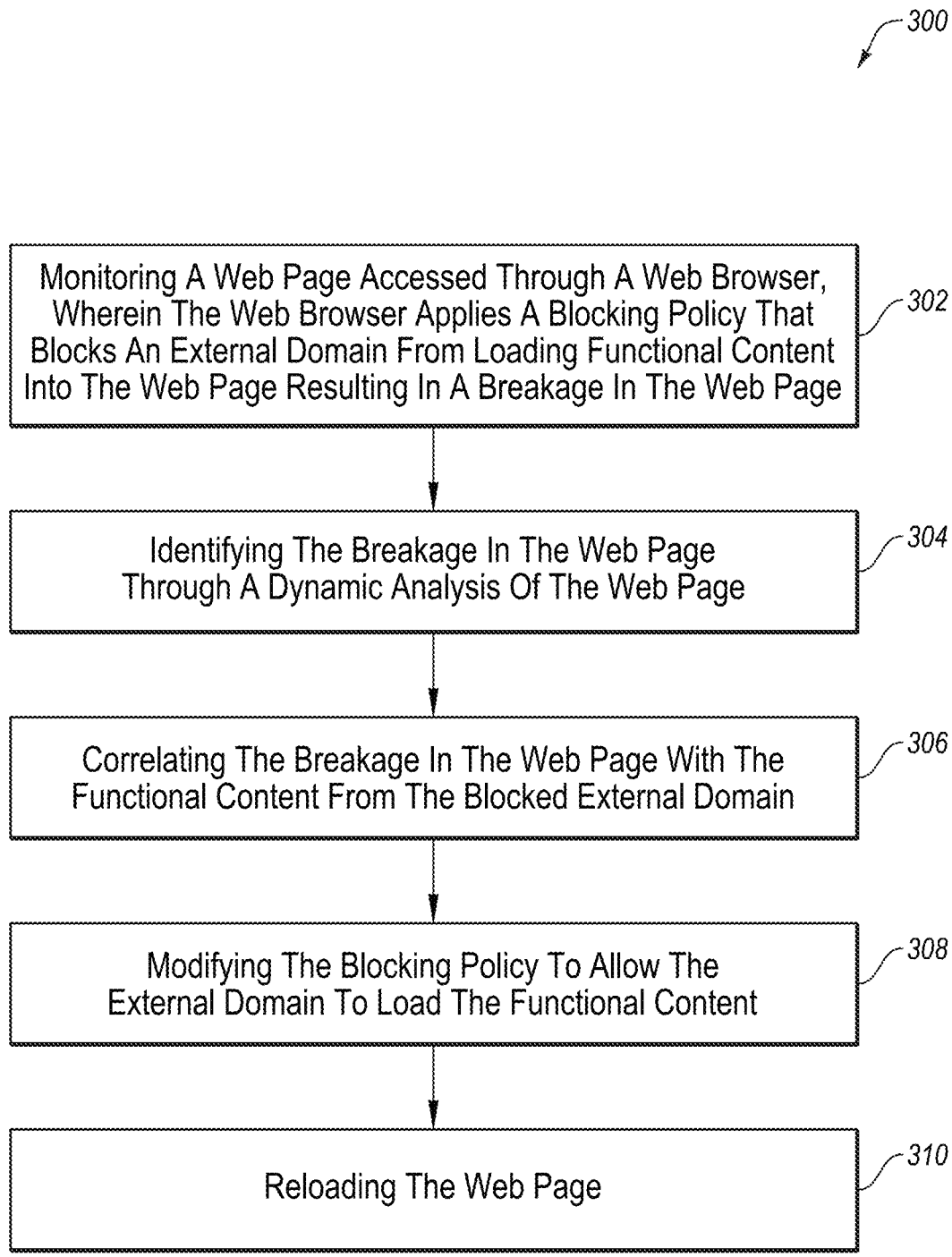
FIG. 3 illustrates a flowchart of an example method for preserving web page functionality through dynamic analysis of host web pages.

FIG. 3 illustrates a flowchart of an example method 300 for preserving web page functionality through dynamic analysis of host web pages. The method 300 may be performed, in some embodiments, by a device or system, such as by the enforcement application 116 or the blocking application 120 of FIG. 1 or the blocking application 200 of FIG. 2. In these and other embodiments, the method 300 may be performed by one or more processors based on one or more computer-readable instructions stored on one or more non-transitory computer-readable media. The method 300 will now be described in connection with FIGS. 1, 2, and 3.

The method 300 may include, at action 302, monitoring a web page accessed through a web browser, wherein the web browser applies a blocking policy that blocks an external domain from loading functional content into the web page resulting in a breakage in the web page. In one embodiment, the blocking policy may be applied by an application, extension, plugin, or addon to a web browser on a user device. The functional content that the external domain is blocked from loading could be anything that causes a breakage to some functional feature in the web page. For example, the functional content may include media references, such as video clips, audio clips, or photos. Alternatively, the functional content may include widgets that allow a user to perform a search on a host web page or other features that allow a user to select or purchase products.

The method 300 may include, at action 304, identifying the breakage in the web page through a dynamic analysis of the web page. In one embodiment, the breakage may be identified in the web page in real-time or within a few seconds after the breakage occurs. In one embodiment, the dynamic analysis may include a visual analysis of the web page. Performing a visual analysis of the web page may include the additional steps of obtaining a model that is trained to identify visual indications of broken functionalities using total or partial perceptual image hashing, the model having been trained using a dataset of exemplary web pages having at least one broken functionality, and applying the model to the web page. For example, prior to the visual analysis of the web page, an exemplary set of web pages having a known breakage may be identified. In one embodiment, the breakage on the exemplary web pages may be achieved by intentionally blocking one or more known functional domains from loading content into the web page. Once this exemplary set of web pages having a known breakage is obtained, a model may be trained to identify visual indications of the broken functionalities using total or partial perceptual image hashing. Once trained, the model may be applied to perform the visual analysis and identify breakages in web pages in real time.

The model generated may be a machine learning model that is configured to identify visual indications of how breakages visually present on the web pages. These visual indications may include whatever is commonly displayed on a web page when a breakage occurs. For example, the model may be trained to identify blank spots on a web page or other words, symbols, patterns, etc. that are displayed on a web page when a breakage has occurred. A hardware-accelerated JavaScript library (e.g., "TensorFlow.js") may be used to train and deploy this machine learning model in order to identify web page breakages dynamically.

In another embodiment, the dynamic analysis may includer a DOM analysis of the web page. Performing a DOM analysis of the web page may include analyzing a console of the web page, a local position on the web page, an element name, a structure, or a related class/style. In one embodiment, a missing element may be the source of a breakage. In this embodiment, the missing element may be identified by detecting a partially or entirely empty content division element (<div>) within the DOM. A corresponding functionality to the missing elements may be identified by determining a local position on the web page, element names, structure, and their related classes and styles. For example, a form or survey may have field specific styles already indicated in a previously included cascading style sheets (e.g., "progressWrapper").

In another embodiment, the dynamic analysis of the web page may include detecting a recognition, by the web page itself, of the breakage. For example, the web page may display a visual indication of the breakage through a banner or some other message. In this embodiment, the visual analysis of the web page may include a natural language processing analysis that may determine the content of the message displayed. Alternatively, the DOM analysis may detect an error notice in the console or background of the web page, which may not be presented visually to the user. In this scenario, a natural language processing analysis may also be used to determine the content of the notice.

The method 300 may include, at action 306, correlating the breakage in the web page with the functional content from the blocked external domain. In one embodiment, this correlation may be performed by connecting a load time of the blocked functional content to a time at which the breakage is identified. By correlating the breakage in the web page to the blocked functional content, the external domain responsible for the breakage may be identified.

The method 300 may include, at action 308, modifying the blocking policy to allow the external domain to load the functional content. In one embodiment, the blocking policy may simply allow the external domain to load all content to the web page. In other embodiments, the external domain may be modified to remove any harmful activities, such as tracking activities, before it is permitted to load content to the web page. The method 300 may include, at action 310, reloading the web page.

The method 300 may thus be employed, in some embodiments, to preserve web page functionality through dynamic analysis of host web pages. By dynamically analyzing host web pages, breakages that occur in the web pages due to a blocking policy may be identified and repaired quickly and efficiently thus improving a user experience on the web page while continuing to protect the user from external domains that are harmful and do not provide any functionality to the web page.

Although the actions of the method 300 are illustrated in FIG. 3 as discrete actions, various actions may be divided into additional actions, combined into fewer actions, reordered, expanded, or eliminated, depending on the desired implementation. Further, it is understood that the method 300 may also improve the functioning of a computer system itself. For example, identifying breakages in web pages and repairing those breakages will ensure that web pages are functioning correctly and improve users' experiences on these web pages.

FIG. 4 illustrates an example computer system 400 that may be employed in distinguishing between functional tracking domains and nonfunctional tracking domains on a host web page. In some embodiments, the computer system 400 may be part of any of the systems or devices described in this disclosure. For example, the computer system 400 may be part of any of the user device 104, the blocking server 106, the host server 108, and the third party server 110 of FIG. 1 and the blocking application 200 of FIG. 2.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the methods disclosed herein.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the methods disclosed herein. These computer-executable instructions may be included, for example, in the operating system 410, in one or more applications, such as the enforcement application 116 and the blocking application 120 of FIG. 1 and the blocking application 200 of FIG. 2, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more of the actions of the methods disclosed herein. In some embodiments, the application 414 may be part of the operating system 410 or may be part of an application of the computer system 400, or may be some combination thereof. In some embodiments, the application 414 may function as any one of the enforcement application 116 and the blocking application 120 of FIG. 1 and the blocking application 200 of FIG. 2.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

The invention claimed is:

1. A computer-implemented method for preserving web page functionality through dynamic analysis of host web pages, at least a portion of the method being performed by a computing device comprising one or more processors, a memory, and an operating system stored within the memory, the computer-implemented method comprising:

monitoring a web page accessed through a web browser, wherein the web browser applies a blocking policy that blocks an external domain from loading functional content into the web page resulting in a breakage in the web page;

identifying the breakage in the web page through a dynamic analysis of the web page, wherein the dynamic analysis of the web page includes a visual analysis of the web page comprising:
obtaining a model that is trained to identify visual indications of broken functionalities using total or partial perceptual image hashing, the model having been trained using a dataset of exemplary web pages having at least one broken functionality; and
applying the model to the web page;
correlating the breakage in the web page with the functional content from the blocked external domain;
modifying the blocking policy to allow the external domain to load the functional content; and
reloading the web page.

2. The method of claim 1, wherein the dynamic analysis of the web page includes a document object model (DOM) analysis of the web page.

3. The method of claim 2, wherein the DOM analysis identifies the breakage by analyzing a console of the web page, a local position on the web page, an element name, a structure, or a related class/style.

4. The method of claim 1, wherein the dynamic analysis of the web page includes detecting a recognition, by the web page itself, of the breakage.

5. The method of claim 4, wherein the recognition, by the web page itself, of the breakage is evidenced by a visual banner on the web page that identifies the breakage.

6. The method of claim 5, wherein the banner is identified through a visual analysis of the web page and a natural language processing analysis is performed on a message contained within the banner.

7. The method of claim 1, wherein the breakage in the web page is correlated to the functional content from the blocked external domain by connecting a load time of the blocked functional content to a time at which the breakage is identified.

8. One or more non-transitory computer-readable media comprising one or more computer-readable instructions that, when executed by one or more processors of a privacy server, cause the privacy server to perform a method for preserving web page functionality through dynamic analysis of host web pages, the method comprising:
monitoring a web page accessed through a web browser, wherein the web browser applies a blocking policy that blocks an external domain from loading functional content into the web page resulting in a breakage in the web page;
identifying the breakage in the web page through a dynamic analysis of the web page, wherein the dynamic analysis of the web page includes a visual analysis of the web page comprising:
obtaining a model that is trained to identify visual indications of broken functionalities using total or partial perceptual image hashing, the model having been trained using a dataset of exemplary web pages having at least one broken functionality; and
applying the model to the web page;
correlating the breakage in the web page to the functional content from the blocked external domain;
modifying the blocking policy to allow the external domain to load the functional content; and
reloading the web page.

9. The one or more non-transitory computer-readable media of claim 8, wherein the dynamic analysis of the web page includes a document object model (DOM) analysis of the web page.

10. The one or more non-transitory computer-readable media of claim 9, wherein the DOM analysis identifies the breakage by analyzing a console of the web page, a local position on the web page, an element name, a structure, or a related class/style.

11. The one or more non-transitory computer-readable media of claim 8, wherein the breakage in the web page is correlated to the functional content from the blocked external domain by connecting a load time of the blocked functional content to a time at which the breakage is identified.

12. A computing device comprising:
one or more processors; and
one or more non-transitory computer-readable media comprising one or more computer-readable instructions that, when executed by the one or more processors, cause the computing device to perform a method for preserving web page functionality through dynamic analysis of host web pages, the method comprising:
monitoring a web page accessed through a web browser, wherein the web browser applies a blocking policy that blocks an external domain from loading functional content into the web page resulting in a breakage in the web page;
identifying the breakage in the web page through a dynamic analysis of the web page, wherein the dynamic analysis of the web page includes a visual analysis of the web page comprising:
obtaining a model that is trained to identify visual indications of broken functionalities using total or partial perceptual image hashing, the model having been trained using a dataset of exemplary web pages having at least one broken functionality; and
applying the model to the web page;
correlating the breakage in the web page to the functional content from the blocked external domain;
modifying the blocking policy to allow the external domain to load the functional content; and
reloading the web page.

13. The computing device of claim 12, wherein the dynamic analysis of the web page includes a document object model (DOM) analysis of the web page.

14. The computing device of claim 13, wherein the DOM analysis identifies the breakage by analyzing a console of the web page, a local position on the web page, an element name, a structure, or a related class/style.

* * * * *